United States Patent [19]

Kamemoto

[11] Patent Number: 4,800,433
[45] Date of Patent: Jan. 24, 1989

[54] PROGRESSIVE SCANNING CONVERSION SYSTEM FOR TELEVISION IMAGE DISPLAY APPARATUS

[75] Inventor: Kazuhiro Kamemoto, Kumagaya, Japan

[73] Assignee: Kabushiki Kaisha Toshiba, Kanagawa, Japan

[21] Appl. No.: 146,178

[22] Filed: Jan. 20, 1988

[30] Foreign Application Priority Data

Jan. 21, 1987 [JP] Japan .................................. 62-9995

[51] Int. Cl.$^4$ .......................... H04N 5/14; H04N 9/20
[52] U.S. Cl. ..................................... 358/168; 358/74; 358/21 R; 358/65; 358/140
[58] Field of Search ............. 358/140, 166, 168, 21 R, 358/27, 29, 65, 74

[56] References Cited

U.S. PATENT DOCUMENTS

| | | | |
|---|---|---|---|
| Re. 32,358 | 2/1987 | Powers | 358/140 |
| 3,700,787 | 10/1972 | Arumugham | 358/74 |
| 4,209,808 | 6/1980 | Harwood | 358/74 |
| 4,253,121 | 2/1981 | Avery | 358/74 |
| 4,587,554 | 5/1986 | Tamura et al. | 358/74 |
| 4,661,850 | 4/1987 | Strolle et al. | 358/140 |
| 4,672,446 | 6/1987 | Ikeda | 358/140 |

OTHER PUBLICATIONS

Japanese Patent Disclosure No. 61-139180, Double Scan Conversion Apparatus.

Japanese Patent Disclosure No. 60-259082, Television Receiver.

NHK Technical Bulletin (Monthly), Dec. 1984, pp. 507-512, "Improvement of Images by Progressive Scan Conversion".

*Primary Examiner*—James J. Groody
*Assistant Examiner*—John K. Peng
*Attorney, Agent, or Firm*—Finnegan, Henderson, Farabow, Garrett, & Dunner

[57] ABSTRACT

A progressive scanning conversion circuit for converting video signals corresponding to an original image from a predetermined format video signals having an increased scan line rate, the video signals each having a brightness level corresponding to a portion of the original image. The progressive scanning conversion circuit includes a scan line rate increasing circuit (32) responsive to receipt of a video signal having the interlace format scan line rate for increasing the scan line rate of the video signal to form a progressive format video signal, a luminance signal generating circuit (36) for generating a luminance signal corresponding to the brightness level of the corresponding portion of the original image in response to the progressive format video signal, a brightness compensation circuit (34) for generating a brightness compensation signal in response to the luminance signal, and a drive circuit (30) for amplifying the progressive format video signal and adjusting the brightness level thereof in response to the compensation signal.

8 Claims, 4 Drawing Sheets

PROGRESSIVE SCANNING CONVERSION SYSTEM FOR TELEVISION IMAGE DISPLAY APPARATUS

FIELD OF THE INVENTION

The present invention relates generally to a scanning conversion system for converting television signals transmitted by an interlaced scanning system into those of a progressive scanning system. More particularly, it relates to a scanning conversion system apparatus for converting a 2:1 interlaced scanning signal into a progressive scanning signal.

BACKGROUND OF THE INVENTION

The interlaced scanning system is used widely for the conventional television systems. In the interlaced scanning system, a one frame image is composed of two fields; an odd field and an even field. Therefore, in an NTSC system television signal, for example, the number of scanning lines per frame image is 525 lines, and in each field, the number is halved to 262.5 lines. In a displayed image obtained with the interlaced scanning system, vertical scanning lines are generally rough and conspicuous, thus causing deterioration of the quality of displayed images.

Progressive scanning television receivers also have been proposed in the art. In a progressive scanning television receiver the horizontal line rate is doubled, and each line of frame image is displayed twice. As a result, a displayed image has twice the usual number of scanning lines found in the interlaced scanning system. Thus, various adverse influences on the displayed image, such as the visibility of the vertical line structure and line flicker caused by the interlaced scanning system, are reduced. Accordingly, progressive scanning television receivers facilitate the overall improvement of picture quality.

In one known form of progressive scanning television receiver, a scanning conversion circuit, as shown in FIG. 1, is provided. In the scanning conversion circuit each horizontal line of video signal is stored in one of two line memories 10a and 10b. The video input signal is alternatively applied to the line memories 10a and 10b through a video input switch 12 and read from the line memories 10a, 10b through a video output switch 14. As a line signal of the video input signal is stored in one memory 10a the other line signal of the video signal previously stored in the other memory 10b is read twice. Switch positions are then reversed with the video input signal being stored in the line memory 10b and read twice from the line memory 10a. Clock signals for controlling read/write operations of the line memories 10a, 10b are provided by a clock source 16, which provides a write clock signal to a multiplier 18. The multiplier 18 doubles the frequency of the write clock signal to produce a read clock signal. That is, the frequency of the read clock signal is two times of the frequency of the write clock signal. The write and read clock signals are applied to respective ones of the line memories 10a, 10b by means of a clock signal switch 20 synchronized with the video input switch 12 and the video output switch 14, such that the memory which is reading is clocked at twice the rate of the memory which is writing, thereby doubling the line rate of the video output signal.

As one horizontal line of the video signal is being stored in one line memory 10a, the horizontal line previously stored in the other memory 10b is recovered or read twice, thereby providing two lines of time-compressed video signal within one standard line interval in the interlaced scan line rate system. The memory output is applied to a display having a doubled horizontal scan rate synchronized with the readout of the memory 10a, 10b, thereby doubling the number of displayed lines of the video signal, compared to the interlaced scan line rate system.

In the NTSC system television signal, odd and even field video signals having each 262.5 scanning lines are transmitted by interlaced scanning per 1/60 sec., thereby to form a one frame image of 525 scanning lines from two of odd and even field video signals. In other words, video signals of two different fields are composed in each 1/60 sec., thereby to form a frame image in the period of 1/30 sec. A scanning converter is adapted to store the transmitted field video signals at prescribed times and read the same to convert the scanning of two field video signals forming one frame, from interlaced scanning to progressive scanning. This reproduces a high quality picture identical in field frequency to the interlaced scanning system and doubled in the number of scanning lines. In progressive scanning, one of the doubled scanning lines appears between normal upper and lower scanning lines within the same field.

The progressive scanning conversion system, however, has a problem in that a change of picture tones of the displayed images compared to the original image may occur under certain conditions. Such a problem in progressive scanning conversion systems is described in an article entitled, "Interlaced scanning conversion in a field deteriorates quality of displayed image" in "Nikkei Electronics", Oct. 20, 1986, pages 190–191.

The problem in progressive scanning conversion systems will be briefly described with reference to an extreme example. If frame images have a striped pattern in which white stripes and gray stripes correspond to scanning lines in the odd field and the even field, respectively, displayed images reproduced in response to the odd fields appear as plain white tone images over the entire display. On the other hand, displayed images reproduced in response to the even fields appear as plain gray tone images over the entire display.

The displayed images of both the plain white tone image and the plain gray tone image are viewed as overlapped by the human eye. The displayed images are viewed as plain light gray tone images over the entire display. Thus, the original image with such a striped pattern is changed to a different image by the progressive scanning system. This is because human eyes have a filter characteristic.

SUMMARY OF THE INVENTION

An object of the present invention is to provide a progressive scanning conversion system for an image display apparatus which can reduce deterioration of the quality of displayed images.

Another object of the present invention is to provide a progressive scanning conversion system for an image display apparatus in which displayed images are substantially identical to original images.

A further object of the present invention is to provide a progressive scanning conversion system for an image display apparatus in which patterns, such as striped patterns of original images, are not deteriorated in displayed images.

Yet another object of the present invention is to provide a progressive scanning conversion system for an image display apparatus which can improve the contrast of a displayed image.

In order to achieve the above object, a progressive scanning conversion system for an image display apparatus according to one aspect of the present invention, includes a scan line rate increasing circuit responsive to receipt of a video signal having the interlace format scan line rate for increasing the scan line rate of the video signal to form a progressive format video signal, a luminance signal generating circuit for generating a luminance signal corresponding to the brightness level of the corresponding portion of the original image in response to the progressive format video signal, a brightness compensation circuit for generating a brightness compensation signal in response to the luminance signal, and a drive circuit for amplifying the progressive format video signal and adjusting the brightness level thereof in response to the compensation signal.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
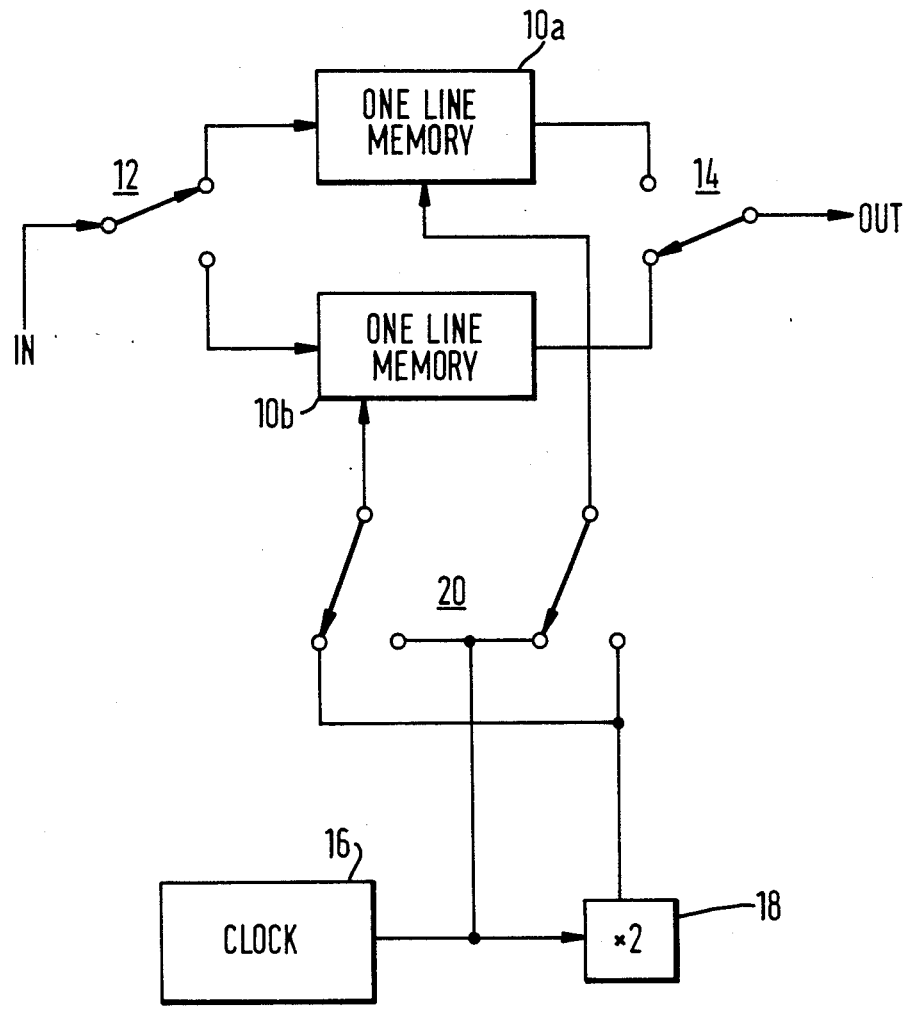
FIG. 1 is a block circuit diagram to explain the progressive scanning conversion system using line memories.
Figure 3:
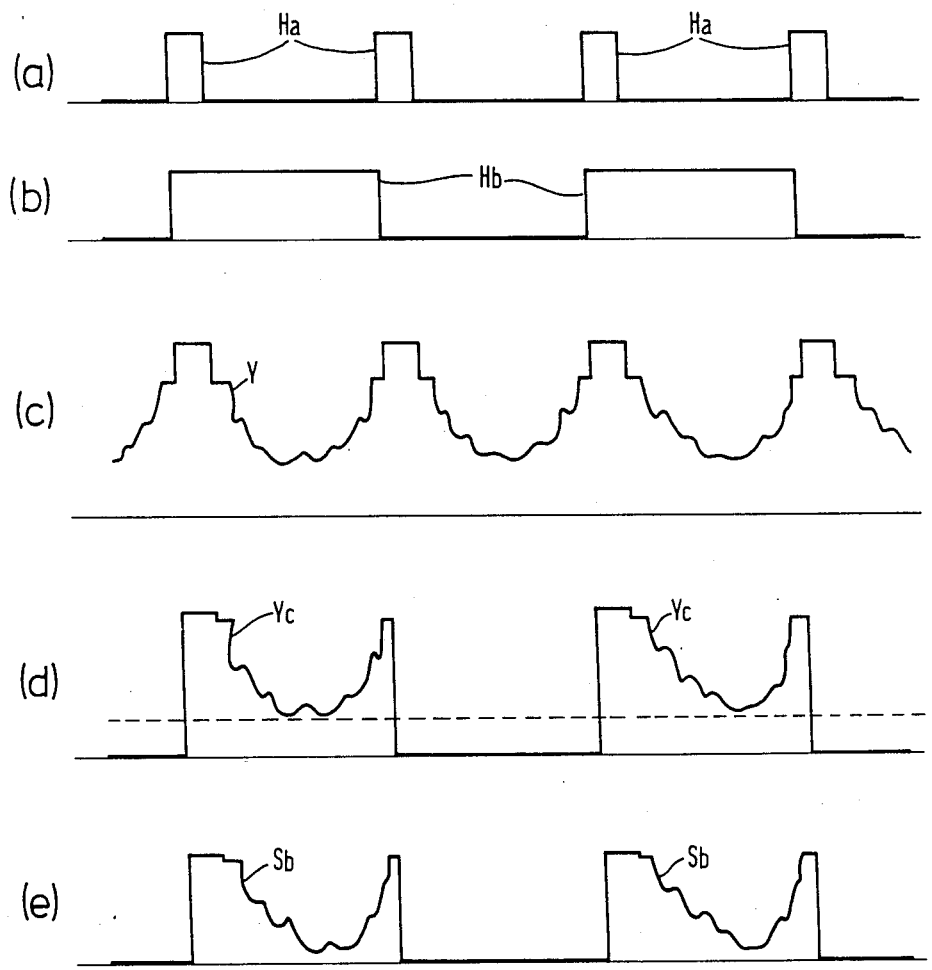
FIG. 3 is a waveform diagram showing the signals in the circuit of FIG. 2.
Figure 4:
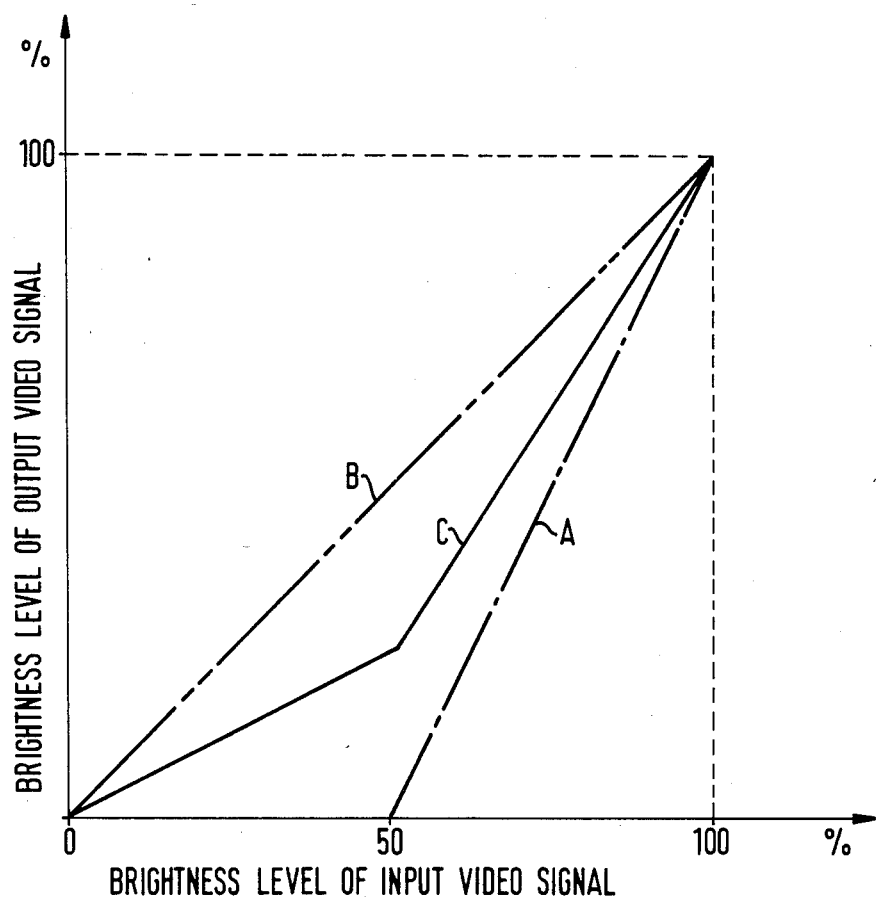
FIG. 4 is a graph showing the brightness compensation characteristics of the progressive scanning conversion system according to the present invention.

The present invention will be described in detail with reference to FIGS. 2 through 4. Throughout the drawings, reference numerals or letters used in FIG. 1 will be used to designate like or equivalent elements for simplicity of explanation.

Figure 2:
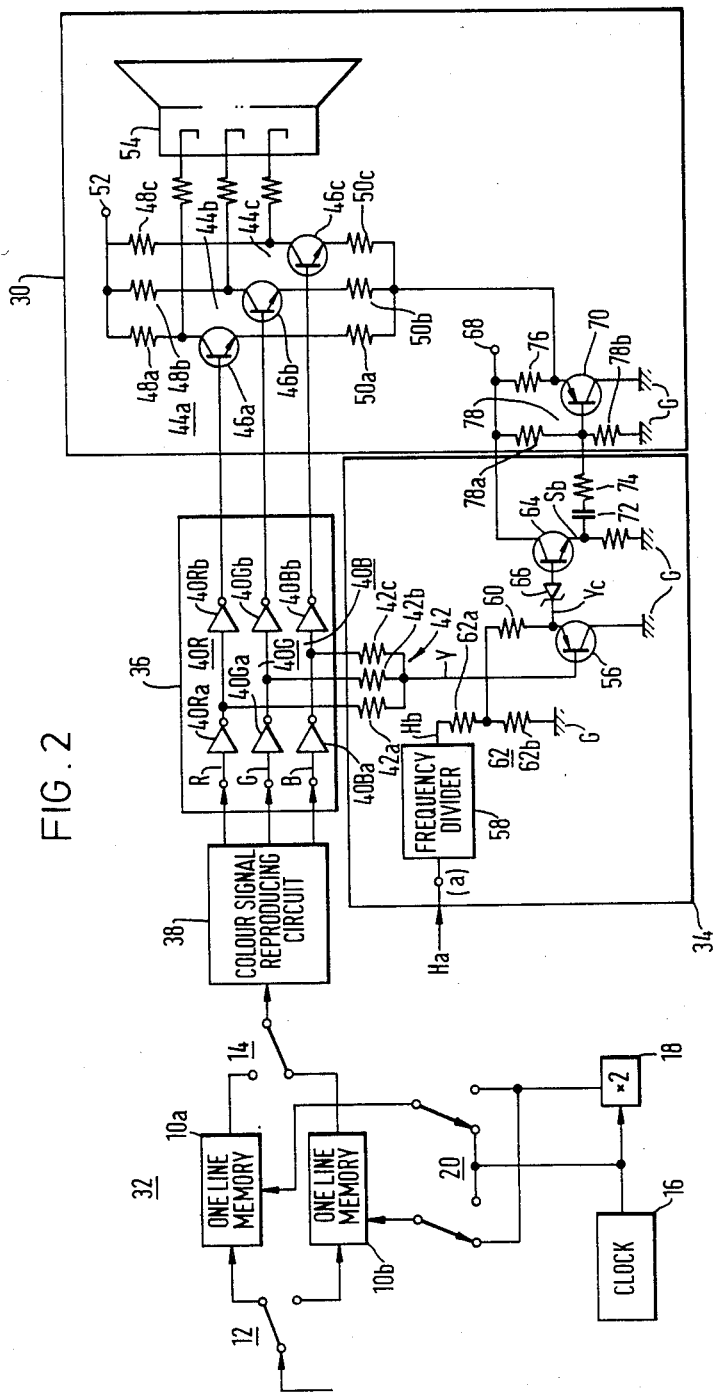
FIG. 2 is a schematic circuit diagram showing a television receiver embodying a progressive scanning conversion circuit according to the present invention.

Referring now to FIG. 2, a portion of a television receiver embodying a progressive scanning conversion system according to the present invention will be described in detail. The television receiver of FIG. 2 includes a CRT (Cathode Ray Tube) drive circuit 30, a scanning conversion circuit 32, an interpolating signal brightness compensation circuit 34 and an interface circuit 36 for coupling scanning conversion circuit 32 and interpolating signal brightness compensation circuit 34 to the CRT drive circuit 30.

In the scanning conversion circuit 32, a video input signal is alternately applied to a pair of line memories 10a and 10b through a video input switch 12 and read from the line memories 10a, 10b through a video output switch 14. As a line signal of the video input signal is stored in one memory 10a the other line signal of the video signal previously stored in the other memory 10b is read twice. Switch positions are then reversed with the video input signal being stored in the line memory 10b and read twice from the line memory 10a. Clock signals for controlling read/write operations of the line memories 10a, 10b are provided by a clock source 16, which provides a write clock signal to a multiplier 18. The multiplier 18 doubles the frequency of the write clock signal to produce a read clock signal. That is, the frequency of the read clock signal is two times of the frequency of the write clock signal. The write ane read clock signals are applied to respective ones of the line memories 10a, 10b by means of a clock signal switch 20 synchronized with the video input switch 12 and the video output switch 14, such that the memory which is reading is clocked at twice the rate of the memory which is writing, thereby doubling the line rate of the video output signal.

The double line rate video output signal is applied to a conventional color signal reproducing circuit 38. Thus, double line rate color signals R, G, B, are reproduced from the double line rate video output signal by the color signal reproducing circuit 38 and then applied to the interface circuit 36. The color signals R, G, B are parallelly transmitted through three series inverter circuit 40R, 40G, 40B, each comprised of a pair of inverter 40Ra and 40Rb, 40Ga and 40Gb and 40Ba and 40Bb, respectively. The color signals R, G, B are divided after transmission through the leading ones 40Ra, 40Ga and 40Ba in each pair of the series inverter circuits 40R, 40G and 40B. The divided color signals R, G, B are combined with each other in a matrix circuit 42. The matrix circuit 42 is comprised of matrix resistors 42a, 42b and 42c. So that a luminance signal Y, as shown in FIG. 3(c), is obtained from the common terminal of matrix resistors 42a, 42b and 42c.

The color signals R, G, B transmitted through the trailing ones 40Rb, 40Gb and 40Bb in each pair of the series inverter circuits 40R, 40G and 40B are applied to the CRT drive circuit 30. In the CRT drive circuit 30, the color signals R, G, B are parallelly amplified in power by transistor amplifiers 44a, 44b and 44c. The transistor amplifiers 44a, 44b and 44c are each comprised of a transistor 46a, 46b, 46c, a collector load resistor 48a, 48b, 48c and an emitter resistor 50a, 50b, 50c. The other ends of the collector load resistors 48a, 48b, 48c are connected to a power supply terminal 52. The other ends of the emitter resistors 50a, 50b, 50c are connected in common. The amplified color signals R, G, B are output from the collectors of transistors 46a, 46b, 46c and applied to cathode terminals of a CRT display 64, respectively.

The luminance signal Y obtained by the matrix resistors 42a, 42b, 42c, as shown in FIG. 3(c), is applied to a brightness compensation circuit 34. In the brightness compensation circuit 34, the luminance signal Y is applied to the base of a transistor 56. The collector of the transistor 56 is coupled to a reference potential source, i.e., a ground terminal G. The emitter of the transistor 56 is coupled to a frequency divider 58 through an emitter resistor 60 and a voltage divider 62. The voltage divider 62 is comprised of a pair of series resistors 62a and 62b and connected between the frequency divider 58 and the ground terminal G. The frequency divider 58 divides the frequency of a horizontal scanning pulse Ha for a horizontal line scanning of the CRT display 54, as shown in FIG. 3(a), by ½. Thus, a frequency divided horizontal scanning pulse Hb, as shown in FIG. 3(b), is obtained. The frequency divided horizontal scanning pulse Hb is applied to the emitter of the transistor 56 and level controlled by the luminance signal Y therein. Thus, a level controlled luminance signal Yc, as shown in FIG. 3(d), is output from the emitter of the transistor 56.

This level controlled luminance signal Yc is applied to the base of a buffer transistor 64 through a zener diode 66. The collector of the buffer transistor 64 is coupled to another power supply source 68. The emitter of the buffer transistor 64 is coupled to the ground terminal G. The zener diode 66 slices the level controlled luminance signal Yc with a predetermined zener voltage Vz. Thus, a brightness compensation signal Sb, as shown in FIG. 3(e), is output from the emitter of the buffer transistor 64.

The brightness compensation signal Sb thus obtained is applied to the base of a bias control transistor 70 through a DC cutoff capacitor 72 and a level regulating resistor 74. The emitter of the bias control transistor 70 is coupled to the second power supply terminal 78 through an emitter resistor 76. The collector of the bias control transistor 70 is connected to the ground terminal G. The base of the bias control transistor 70 is further connected to a base bias circuit 78 comprised of a pair of series resistors 78a and 78b connected between the second power supply terminal 68 and the ground terminal G. The emitter termial of the bias control transistor 70 is further connected to the common terminal of emitter resistors 50a, 50b and 50c. Thus, the brightness compensation signal Sb obtained on the emitter of the bias control transistor 70 is applied to the common terminal of the emitter resistors 50a, 50b and 50c and controls the biases of the transistor amplifiers 46a, 46b and 46c.

Accordingly, the brightness compensation signal Sb controls the emitter biases of the transistor amplifiers 46a, 46b and 46c. The displayed image on the CRT display 54 becomes dark if the level of the brightness compensation signal Sb is high. The displayed image becomes bright if the level of the brightness compensation signal Sb is low. The timing of the brightness compensation signal Sb corresponds to the interpolating signals, i.e., every other line signals read out from the line memories 10a, 10b. Therefore, the brightness compensation signal Sb shown in FIG. 3(e) operates to make the interpolating signals more dark in the gray portion of luminance signal. The brightness control characteristics for the interpolating signals is shown by a graph A in FIG. 4. On the other hand, the brightness characteristics of the other line signals, which are not controlled by the interpolating signal brightness compensation circuit 34, is shown by a graph B in FIG. 4. When the line signals having the characteristics A and B are displayed on the CRT 54, a resultant images are viewed as overlapped by the human eye. Thus, the brightness control characteristics for the resultant images as shown by a graph C in FIG. 4 are obtained.

The progressive scanning conversion system according to the present invention can reduce flickering of scanning lines. In the conventional interlaced scanning system, flickering of scanning lines becomes worse when the brightness level of the frame image increases. On the other hand, with the present invention it is possible to avoid flickering even when the brightness level of interpolating signals is changed according to brightness level of the video signal during the conversion to the progressive scanning signals from the interlaced scanning signals.

That is to say, in the case of fully bright or fully dark video signals, i.e., the signals with about 100% brightness level or 0% brightness level, the brightness level of the images displayed by the progressive scanning conversion is almost the same as the brightness level of the input signals. In the case of medium bright video signals, i.e., the signals with less than 100% or higher than 0% brightness level, the brightness level of the images displayed by the progressive scanning conversion is decreased in response to the level of the input signals. In this embodiment, the signal with 50% brightness level is most decreased its brightness level.

The operations of the progressive scanning conversion circuit thus composed are described below.

Under the status where the interpolating signal brightness compensation circuit 34 is not in operation, color signals R, G and B, which have been doubled in their frequency by line memories 10a, 10b in the scanning conversion circuit 32, are applied to the interface circuit 36. Then, the color signals R, G and B are applied to the base terminals of the transistors 46a, 46b and 46c in the transistor amplifiers 54a, 54b and 54c.

When the progressive scanning conversion circuit according to the present invention is implemented, the scanning lines are fully interpolated in the bright portions of a frame image as in the past, and the brightness level of the interpolating lines can be controlled. Originally, flickering of frame image becomes more conspicuous when the the frame image is more bright. Thus flickering makes viewers nervous. However, according to the present invention, even when the brightness of the interpolation lines is controlled in the dark portions, the flickering improving effect of the progressive scanning is not impaired, and the following frame image quality improving effects are obtained.

When the extreme example as mentioned above, i.e., the case that frame images have a striped pattern in which white stripes and gray stripes correspond to scanning lines in the odd field and the even field, respectively, is considered, the progressive scanning conversion circuit can maintain the same frame images without changing the pattern of the image. In the case of the example, the brightness of the interpolating signal originated from the odd field is not decreased. So that, the progressive scanning frame image originated from the odd field results a pattern image with all white stripes. On the other hand, the brightness of the interpolating signal originated from the even field is decreased. So that, the progressive scanning frame image originated from the even field results a pattern image of alternating gray stipes and black stripes. Both pattern images are combined in the human eyes. As a result, a pattern image almost the same as the original stripe pattern is reproduced.

Further, the progressive scanning conversion circuit according to the present invention can improve the contrast of the reproduced frame image. This is because the difference of the brightness level between video signals with relatively high brightness and relatively low brightness is increased. That is, the gain of the brightness is increased, as shown in FIG. 3. The brightness of white signals doubles through normal conversion and dark signal are made more dark by restricting the amount of interpolation.

The present invention can not be limited to the embodiment, as described above. That is, the progressive scanning conversion circuit according to the present invention can be modified in various ways. For example, the embodiment shown in FIG. 2 includes a plurality of inverters 40Ra through 40Bb in the interface circuit for giving a predetermined phase relationships between the brightness compensation signal Sb and the color signals R, G, B. However, the phase relationshiops can be obtained by providing one inverter in any circuit portion between the matrix circuit 42 and the common terminal of the emitter resistors 50a, 50b and 50c.

Further, all of the color signals R, G, B are used for obtaining the brightness compensation signal Sb in the embodiment shown in FIG. 2. However, one or two of the color signals R, G, B can be used for the purpose. For example, only the color signal G can be used for the purpose. This is because the color signal G has a major intensity of about 60% in the luminance signal Y. It is also possible to use such a signal, i.e., the luminance signal or the like, in a tuner circuit of the television receiver.

As described above, the present invention can provide an extremely preferable scanning conversion system for changing television signals transmitted an interlaced scanning system into signals for a progressive scanning system.

While there have been illustrated and described what are at present considered to be preferred embodiments of the present invention, in will be understood by those skilled in the art that various changes and modifications may be made, and equivalents may be substituted for elements thereof without departing from the true scope of the invention. In addition, many modifications may be made to adapt a particular situation or material to the teaching of the present invention without departing from the central scope thereof. Therefore, it is intended that this invention not be limited to the particular embodiment disclosed as the best mode contemplated for carrying out this invention, but that the invention include all embodiments falling within the scope of the appended claims.

What is claimed is:

1. A progressive scanning conversion circuit for converting video signals corresponding to an original image from a predetermined interlaced format scan line rate to progressive format video signals having an increased scan line rate, the video signals each having a brightness level corresponding to a portion of the original image, comprising:

means (32) responsive to receipt of a video signal having the interlaced format scan line rate for increasing the scan line rate of the video signal to form a progressive format video signal;

drive means (30) for amplifying the progressive format video signal, characterised in that the progressive scanning conversion circuit further comprises:

means (36) for generating a luminance signal corresponding to the brightness level of the corresponding portion of the original image in response to the progressive format video signal; and brightness compensation means (34) for generating a brightness compensation signal in response to the luminance signal;

and wherein:

the drive means (30) is provided for adjusting the brightness level thereof in response to the brightness compensation means (34).

2. The progressive scanning conversion circuit of claim 1 wherein the scan line rate increasing means (32) includes a pair of line memories (10a, 10b), and switch means (12, 14, 20) for alternately reading and writing the video signal.

3. The progressive scanning conversion circuit of claim 2 wherein the switch means includes clock means (16) for controlling the reading and writing of the video signal.

4. The progressive scanning conversion circuit of claim 1 wherein the luminance signal generating means (36) includes three pairs of inverters, each pair being connected in series.

5. The progressive scanning conversion circuit of claim 4 wherein the luminance signal generating means (36) also includes a matrix means (42) for combining the red, blue and green components of the video signal to form the luminance signal.

6. The progressive scanning conversion circuit of claim 6 wherein the drive means (30) includes three drive transistors (46a, 46b, 46c), the brightness compensation signal being supplied to emitter of each drive transistor (46a, 46b, 46c).

7. The progressive scanning conversion circuit of claim 6 wherein the drive means (30) receives a horizontal scanning synchronizing pulse corresponding to the interlaced scan line rate, and includes a frequency divider (58) for dividing the pulse and transistor means (56) for responsive to the luminance signal for controlling the level of the divided pulse to form a level controlled luminance signal.

8. The progressive scanning conversion circuit of claim 7 wherein the compensation means (34) also includes zener diode means (66) for slicing the level controlled luminance signal at a prescribed threshold level.

* * * * *